United States Patent
Murthy et al.

[11] Patent Number: 6,144,523
[45] Date of Patent: *Nov. 7, 2000

[54] SIMPLIFIED CONICAL BEARING WITH INDEPENDENT FLOW PATHS

[75] Inventors: Samnathan Murthy, Santa Cruz; Alan Lyndon Grantz, Aptos; Steve Parsoneault, Scotts Valley; Roger Allen Addy, Gilroy; Peter R. Riegler, Capitola; Mohamed Mizanur Rahman, San Jose, all of Calif.

[73] Assignee: Seagate Technology LLC, Scotts Valley, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/994,099

[22] Filed: Dec. 19, 1997

Related U.S. Application Data

[60] Provisional application No. 60/034,265, Dec. 20, 1996.

[51] Int. Cl.[7] .............................. G11B 17/02; F16C 32/06
[52] U.S. Cl. ........................................ 360/99.08; 384/110
[58] Field of Search .............................. 360/99.08, 99.05, 360/97.02, 99.12; 384/100, 110, 113, 107

[56] References Cited

U.S. PATENT DOCUMENTS

| | | | |
|---|---|---|---|
| 4,223,958 | 9/1980 | Gray | 308/9 |
| 4,795,275 | 1/1989 | Titcomb et al. | 384/107 |
| 4,798,476 | 1/1989 | Sakatani et al. | 384/108 |
| 5,112,142 | 5/1992 | Titcomb et al. | 384/107 |
| 5,559,651 | 9/1996 | Grantz et al. | 360/99.08 |
| 5,623,382 | 4/1997 | Moritan et al. | 360/99.08 |

FOREIGN PATENT DOCUMENTS 8-277835  10/1996  Japan.

*Primary Examiner*—William Klimowicz
*Attorney, Agent, or Firm*—Flehr Hohbach Test Albritton & Herbert LLP

[57] ABSTRACT

A hydrodynamic bearing useful as a bearing cartridge or as the cartridge may be incorporated into a spindle motor or the like, where the bearing includes a stationary shaft and two independent bearings, comprising a top cone and a bottom cone separated by a segment of the shaft. The bearing includes a sleeve rotating around and surrounding the shaft, and the top cone and bottom cone and defining a narrow gap between the sleeve and the shaft and cones. Sealing plates are supported on the sleeve to seal off the ends of the bearing and are located along the shaft beyond the cones. A gap also exists between an interior surface portion of each cone and the shaft. Thus, separate flow paths are established, one around the top cone and one around the bottom cone. By providing two independent paths, the flow rates do not have to be the same in each conical flow path for the bearing seals to function properly.

7 Claims, 7 Drawing Sheets

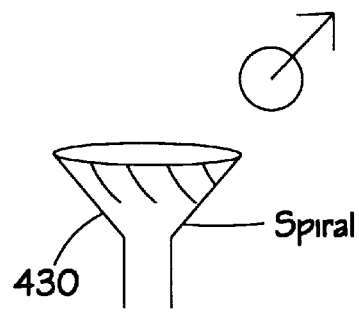
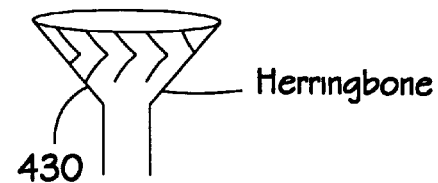
FIG. 5A        FIG. 5B
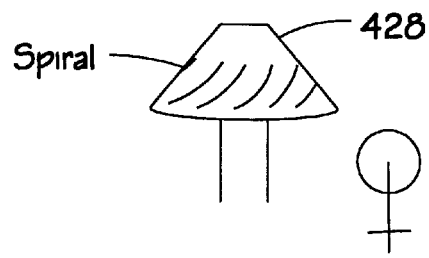
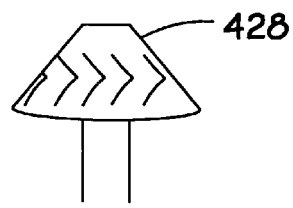
FIG. 5C        FIG. 5D

SIMPLIFIED CONICAL BEARING WITH INDEPENDENT FLOW PATHS

CROSS-REFERENCE TO RELATED APPLICATION

This invention is based on U. S. Provisional Patent Application, Ser. No. 60/034,265 filed Dec. 20, 1996, assigned to the assignee of this application and incorporated herein by reference. This structure is preferably assembled using the method and apparatus described in Attorney Docket No. A-64158/JAS, U.S. patent application Ser. No. 08/991,686, filed Dec. 16, 1997, by Addy et al., assigned to the assignee of this application and incorporated herein by reference.

FIELD OF THE INVENTION

The present invention relates to disc drive storage systems, and more specifically, the present invention relates to a hydrodynamic fluid bearing for use in a disc drive storage system.

BACKGROUND OF THE INVENTION

Magnetic disc drives are used for magnetically storing information. In a magnetic disc drive, a magnetic disc rotates at high speed and a transducing head "flies" over a surface of the disc. This transducing head records information on the disc surface by impressing a magnetic field on the disc. Information is read back using the head by detecting magnetization of the disc surface. The transducing head is moved radially across the surface of the disc so that different data tracks can be read back.

Over the years, storage density has tended to increase and the size of the storage system has tended to decrease. This trend has lead to greater precision and lower tolerance in the manufacturing and operating of magnetic storage discs. For example, to achieve increased storage densities the transducing head must be placed increasingly close to the surface of the storage disc. This proximity requires that the disc rotate substantially in a single plane. A slight wobble or run-out in disc rotation can cause the surface of the disc to contact the transducing head. This is known as a "crash" and can damage the transducing head and surface of the storage disc resulting in loss of data.

From the foregoing discussion, it can be seen that the bearing assembly which supports the storage disc is of critical importance. One typical bearing assembly comprises ball bearings supported between a pair races which allow a hub of a storage disc to rotate relative to a fixed member. However, ball bearing assemblies have many mechanical problems such as wear, run-out and manufacturing difficulties. Moreover, resistance to operating shock and vibration is poor, because of low damping. Thus, there has been a search for alternative bearing assemblies for use with high density magnetic storage discs.

One alternative bearing design which has been investigated is a hydrodynamic bearing. In a hydrodynamic bearing, a lubricating fluid such as air or liquid provides a bearing surface between a fixed member of the housing and a rotating member of the disc hub. In addition to air, typical lubricants include oil or ferromagnetic fluids. Hydrodynamic bearings spread the bearing interface over a large continuous surface area in comparison with a ball bearing assembly which comprises a series of point interfaces. This is desirable because the increased bearing surface reduces wobble or run-out between the rotating and fixed members. Further, improved shock resistance and ruggedness is achieved with a hydrodynamic bearing. Also, the use of fluid in the interface area imparts damping effects to the bearing which helps to reduce non-repeat runout.

However, hydrodynamic bearings themselves suffer from disadvantages, including a low stiffness-to-power ratio and increased sensitivity of the bearing to external loads or shock.

A desirable solution to this problem would be to have the spindle motor attached to both the base and the top cover of the disc drive housing. This would increase overall drive performance. A motor attached at both ends is significantly stiffer than one held by only one end.

Typically, hydrodynamic motor designs provide no method for top cover attachment. The reason for this is that in order to have top cover attachment, the motor would need to be opened on both ends. Opening a motor at both ends greatly increases the risk of oil leakage out of the hydrodynamic bearing. This leakage among other things is caused by small differences in net flow rate created by differing pumping grooves in the bearing. If all of the flows within the bearing are not carefully balanced, a net pressure rise toward one or both ends may force fluid out through the capillary seal. Balancing the flow rates in conventional, known thrust plate bearing designs is difficult because the flow rates created by the pumping grooves are a function of the gaps defined in the hydrodynamic bearing, and the gaps, in turn, are a function of parts tolerances. Thus, a need exists for a new approach to the design of a hydrodynamic bearing based motor to optimize dynamic motor performance stiffness, and damping.

It is also desirable to design a hydrodynamic bearing which is open at both ends for other purposes than fixing both ends of the shaft to the base and cover of a housing. For example, with such an open-ended design, either end (or both) could be extended beyond the sleeve to be coupled to a driver or load, or for other purposes.

An effort has been made to address some of these problems with a conical bearing having independent flow paths. This design is disclosed in Attorney Docket No. A-64188/JAS, U.S. patent application Ser. No. 09/043,066, filed Dec. 19, 1997, entitled "CONICAL HYDRODYNAMIC BEARING WITH TWO INDEPENDENT CIRCULATION PATHS", by Jennings, et al., which is assigned to the Assignee of the present application and incorporated herein by reference. However, further consideration indicated that it would be desirable to simplify the two independent flow paths. Further, it is also desirable to make the capillary seals at the ends of the shaft as reliable as possible. It is also desirable to make the design of the shaft as simple as possible in order to reduce manufacturing costs and maintain achievable tolerances.

SUMMARY OF THE INVENTION

Thus, it is an object of the present invention to create an improved hydrodynamic bearing which is relatively insensitive to changes in load and rotational speed.

Yet another objective of the present invention is to provide a hydrodynamic bearing motor in which the bearing is open at both the upper and lower ends.

A related objective of the invention is to provide a hydrodynamic bearing open at both ends in which the balance of fluid flow within the bearings is maintained.

A further objective of the invention is to design a hydrodynamic bearing useful in a spindle motor or the like in which the motor could be attached to both the top cover and the base of the housing for the spindle motor.

Another objective of the invention is to provide a hydrodynamic bearing useful in a spindle motor or the like which is stiffer than known standard spindle motors which are supported only at one end.

These and other objectives of the present invention are achieved by providing a hydrodynamic bearing useful as a bearing cartridge or as the cartridge may be incorporated into a spindle motor or the like, where the bearing includes a [stationary] shaft and two independent bearings, comprising a top cone and a bottom cone separated by a segment of the shaft. More specifically, the bearing includes a sleeve rotating around and surrounding the shaft, and the top cone and bottom cone and defining a narrow gap between the sleeve and the shaft and cones. Sealing plates are supported on the sleeve to seal off the ends of the bearing and are located along the shaft beyond the cones. A gap also exists between an interior surface portion of each cone and the shaft. Thus, separate flow paths are established, one around the top cone and one around the bottom cone. By providing two independent paths, the flow rates do not have to be the same in each conical flow path for the bearing seals to function properly. Thus, when the load or RPM changes, the flow rates may change but the function of the bearing and its ability to provide stiffness and stability to the system will not be impeded.

The flow path portion between the shaft and the cone may be defined by a flat section or grooves on either the surface of the shaft or the interior surface of the cones.

In one embodiment, outward pumping spiral grooves are used on the conical surfaces to facilitate pumping fluid through the gaps.

The bearing and bearing cartridge embodiments are also characterized by ease of assembly of the conical bearing spaced from each other along the shaft.

The hydrodynamic bearing assembly, and bearing cartridge, as disclosed herein used in a spindle motor, provides enhanced stiffness and damping within the cartridge system.

More specifically, the hydrodynamic bearing includes a stationary shaft including conical bearings separated from each other by a central portion of the shaft. A sleeve is provided rotating around the shaft, having concave regions which mate with the convex conical portions of the shaft and defining gaps therebetween, these gaps defining a portion of the two independent flow paths. A second portion of the independent flow path is provided by having flat, grooved or similarly shaped regions on the shaft extending underneath where the conical pieces are mounted so that an axial opening exists between each conical piece and the shaft along the axial dimension of the conical piece, allowing fluid to flow therethrough. The final portion of each of the two independent recirculation paths is provided by defining a gap between a sealing plate supported on the sleeve adjacent the end of the shaft and an axially and a radially flat extending flat surface of the conical piece. By providing these gaps around the conical elements on the shaft, hydrodynamic bearing fluid can circulate through the gap between the cone and the shaft, between the cone and the sleeve, and between the cone and the sealing plate. The fluid flow is enhanced by bearing grooves found on the outer surface of each conical piece.

Immediately below each conical piece and extending axially along the shaft between the sealing plate and the shaft, a capillary seal is defined to prevent leakage of the bearing fluid into the outer atmosphere.

Other features and advantages of the present invention would become apparent to a person of skill in the art who studies the present invention disclosure given with respect to the following figures.

BRIEF DESCRIPTION OF THE DRAWINGS

FIGS. 5A, 5B, 5C and 5D are perspective views of groove patterns on the conical bearings in the embodiments of FIG. 4.

DETAILED DESCRIPTION OF A PREFERRED EMBODIMENT

Figure 1:
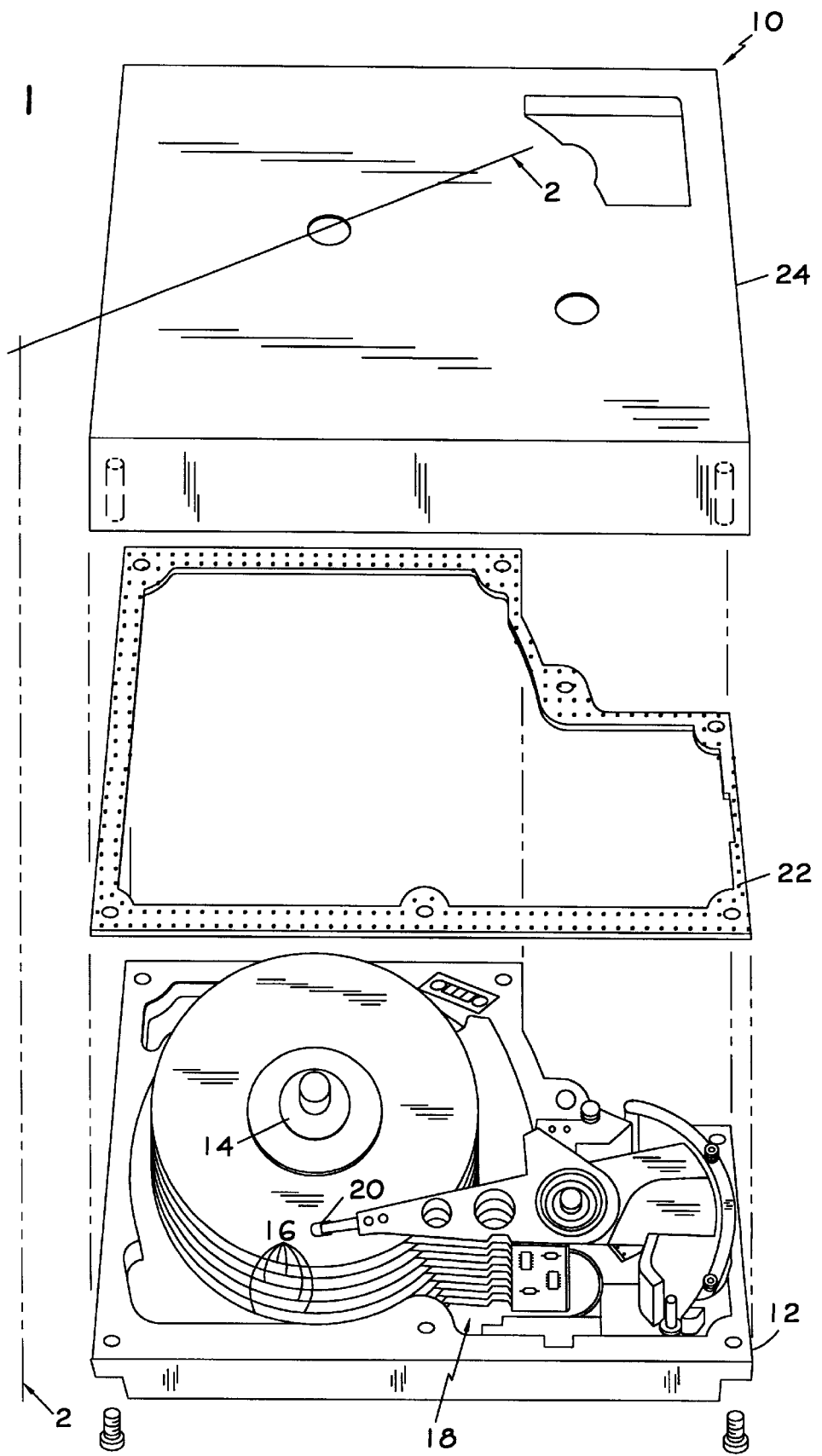
FIG. 1 is an exploded perspective view of a disc drive in which the present invention is useful.

FIG. 1 is an exploded perspective view of a magnetic disc drive storage system in which the present hydrodynamic bearing cartridge could be used. In the example to be discussed below, the use of the hydrodynamic bearing and associated cartridge will be shown in conjunction with a spindle motor. Clearly, this bearing cartridge is not limited to use with this particular design of a disc drive, which is shown only for purposes of the example. Given the stability which this invention achieves, it could also potentially be used to support the actuator for rotation. The bearing cartridge also has numerous other uses outside the field of disc drives.

In this particular example, the storage system 10 includes a housing base 12 having spindle motor 14 which rotatably carries storage discs 16. An armature assembly 18 moves transducers 20 across the surface of the discs 16. The environment of discs 16 is sealed by seal 22 and cover 24. In operation, discs 16 rotate at high speed while transducers 20 are positioned at any one of a radially differentiated track on the surface of the discs 16. This allows the transducers 20 to read and write magnetically encoded information on the surfaces of discs 16 at selected locations. The discs rotate at very high speeds, several thousand RPM, in order to maintain each transducer flying over the surface of the associated disc. In present day technology, the spacing distance between the transducer and the rotating disc surface is measured in microinches; thus it is absolutely essential that the disc does not tilt or wobble.

Figure 2A:
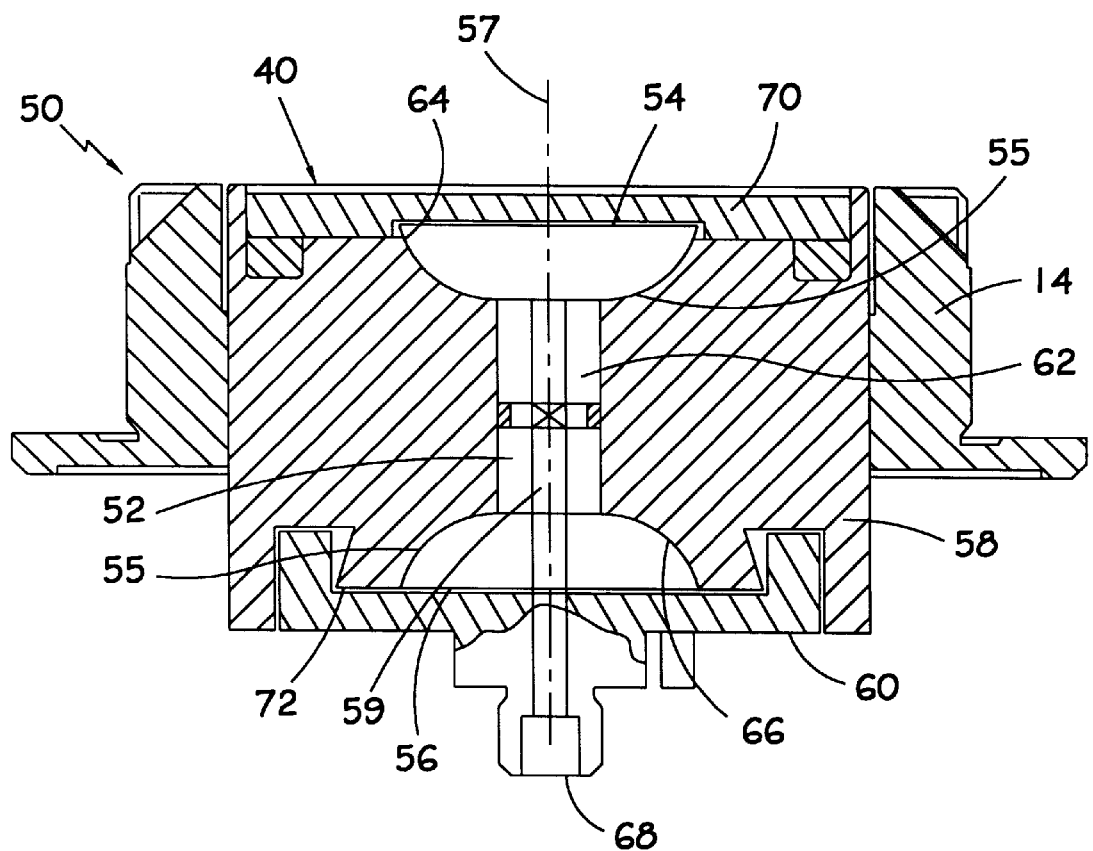
FIGS 2A and 2B are vertical sectional views of a prior art hydrodynamic bearing design.

FIG. 2A is a cross sectional view of a further prior art drive spindle assembly of a type which can be supported only from the base of the housing of the system using the hydrodynamic bearing cartridge, in this case a disc drive assembly. The figure is taken from U.S. Pat. No. 5,559,651, which is assigned to the assignee of the present application and is incorporated herein by reference.

In FIG. 2A, the cartridge 40 which includes the hydrodynamic bearing is shown incorporated in a spindle motor 50 which is usable to drive the discs in the disc drive 10 of FIG. 1. The design includes a drive rotor or hub 14 rotatably coupled to the shaft 52. The shaft 52 includes an upper hemisphere or convex portion 54 and a lower hemisphere or convex portion 56 received in sleeve 58 which rotates relative to the shaft. The shaft 52 is fixedly attached to the base 60, which may be incorporated in or supported from the housing base 12 described with respect to FIG. 1. The sleeve 58 receives the journal 62 of shaft 52 and has upper hemisphere shaped, concave receptacle 64 and lower hemisphere shaped concave receptacle 66. A fill hole 68 is also provided to a reservoir 59 in (as drawn, the upper end) fixed member 52 to provide bearing fluid to the hydrodynamic bearing, and rotor 14 includes a counterplate 70 which is used to close off one end of the hydrodynamic bearing to the atmosphere. In operation, the bearings shown in this figure comprises hydrodynamic bearings in which a lubricating fluid such as oil circulates through gaps between the fixed member which is the shaft and the rotating member which in this case is the sleeve. Rotation of the rotating member causes the lubricating fluid to circulate.

As further shown in FIG. 2A, oil is trapped in the hydrodynamic bearing by a diverging capillary seal 72. However, as can also be seen from an inspection of this Figure, this design is not adaptable to being opened to the atmosphere at both ends, as the counterplate 70 is provided at one end to close off the hydrodynamic bearing to the atmosphere, the counterplate 70 rotating with the sleeve.

Figure 2B:
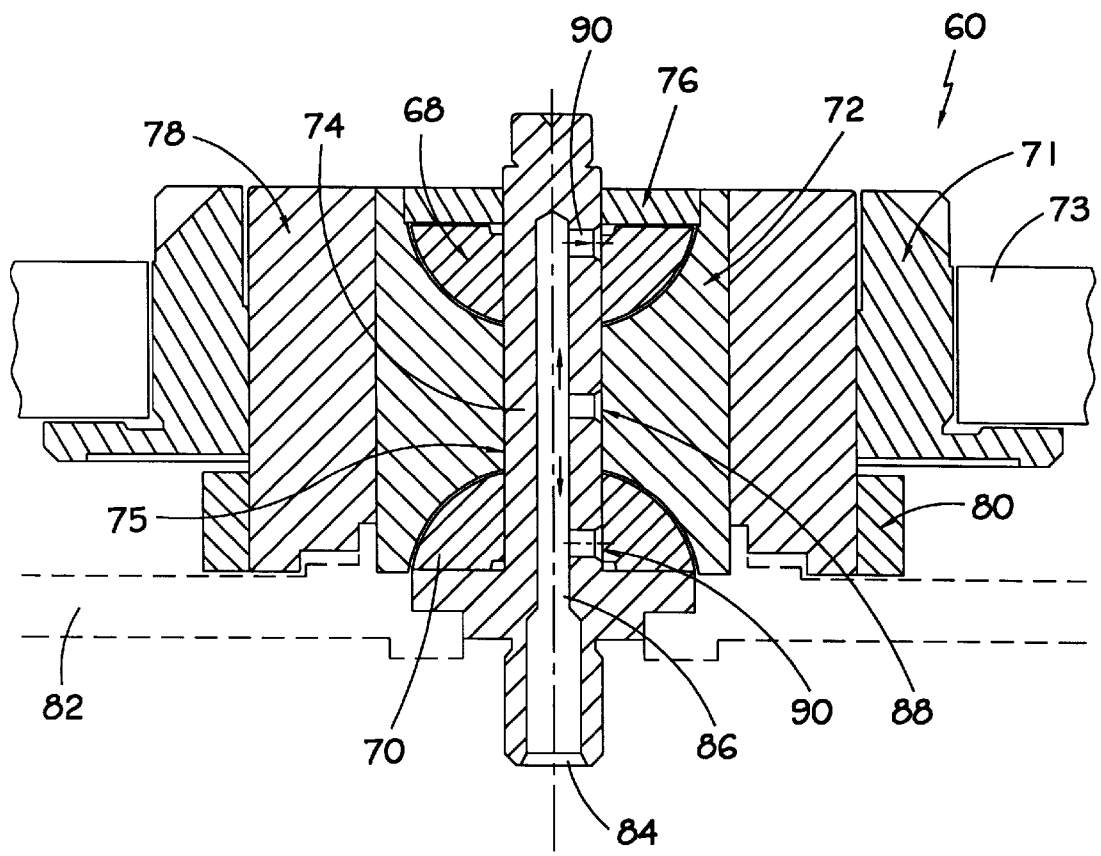

FIG. 2B is a variation of the design shown in FIG. 2A. This Figure, also taken from the '651 patent, illustrates the use of a central reservoir 86. Spindle 60 includes a rotor hub 71 which carries disc 73 and is rotatably coupled to shaft 75. Shaft 75 includes upper hemisphere 68 and lower hemisphere 70 received in cartridge sleeve 72. Sleeve 72 receives journal 74 of shaft 75. The top portion of shaft 75 is sealed with seal plate 76, and journal 74 extends therethrough. Hub spacer 78 is coupled to rotor hub 71, and carries permanent magnets 80. Shaft 75 is received in base 82, and includes fill hole 84. Fill hole 84 connects to passageway or reservoir 86, which extends through the center of shaft 75. Passageway 86 connects to center passageway or bore 88 and distal bores 90. In operation, oil flows into bore 86 through center bore 88 and out distal bores 90. This is indicated by arrows shown in bore 86. Again, in this embodiment, the fluid circulation paths in the hydrodynamic bearing are sealed off from the outer atmosphere by seal thrust plate 76.

Figure 4:
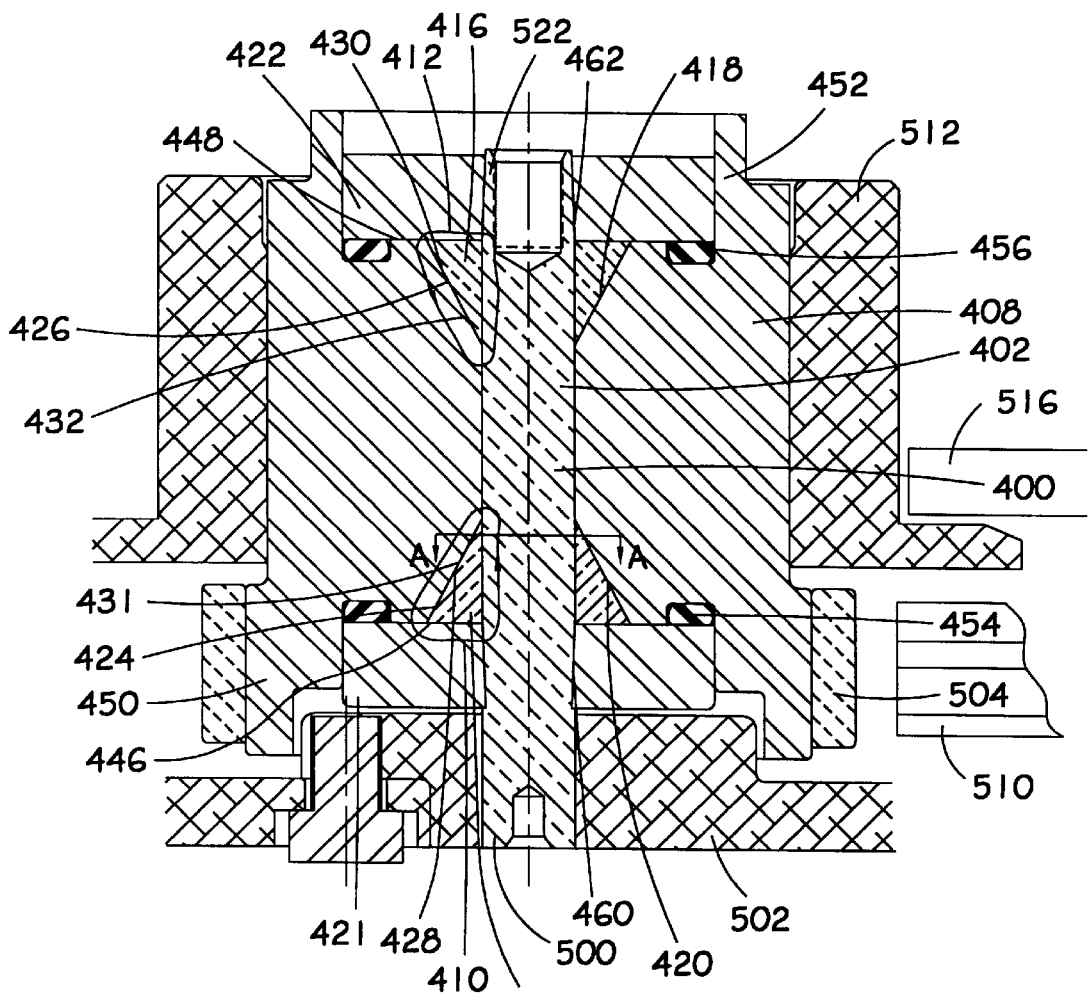
FIG. 4 is a vertical sectional view of an embodiment of the present invention.

The present invention to be described with respect to FIGS. 4, 5 and 6, provides the improvement of allowing both the top and bottom ends of a hydrodynamic bearing to be open to the atmosphere. Thus, in a fixed shaft motor which incorporates the present invention, both upper and lower ends of the shaft could be fastened to the base and top cover of the housing, so that the stiffness of the motor and its resistance to shock as well as its alignment to the rest of the system is enhanced and maintained.

Figure 3:
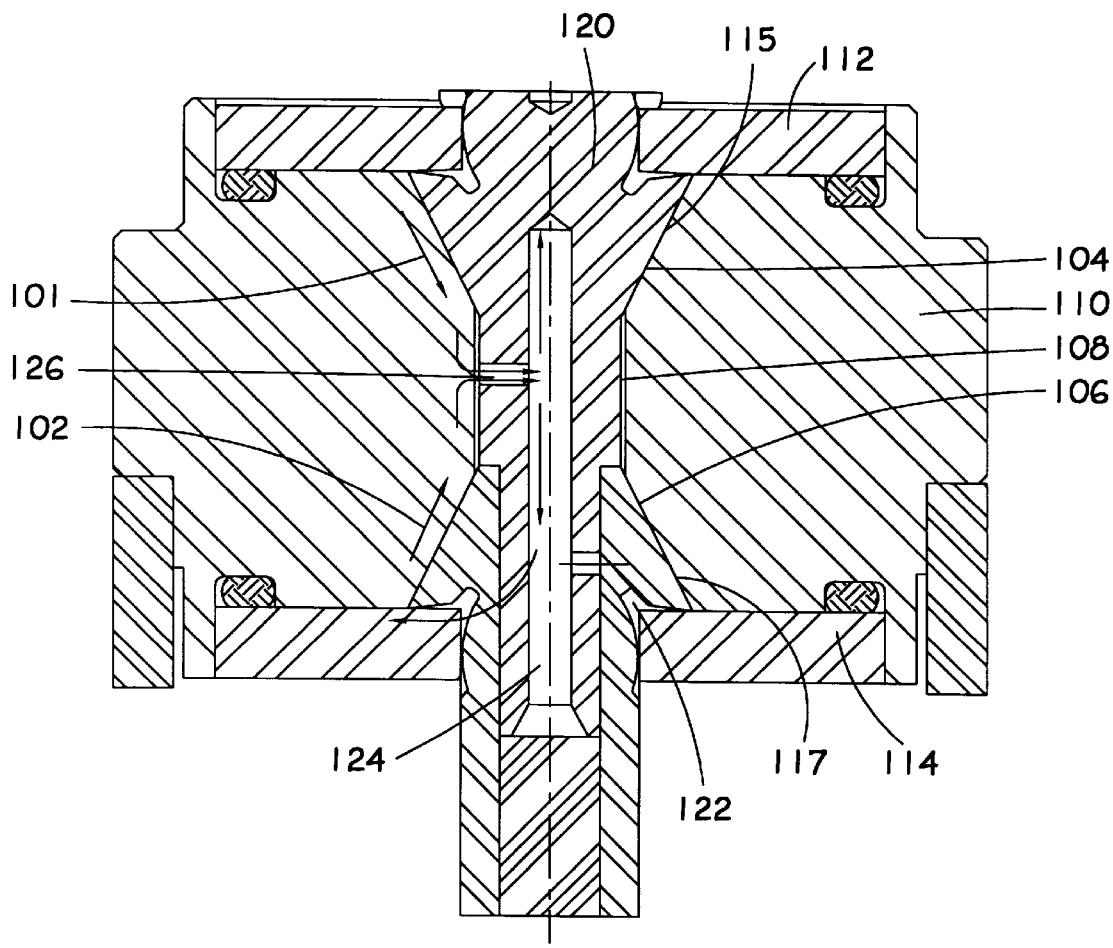
FIG. 3 is a vertical sectional view of a related hydrodynamic bearing design.

Referring next to FIG. 3, a design related to the present invention is shown. This design is the subject of Attorney Docket No. A-64188/JAS, U.S. patent application Ser. No. 09/043,066, filed Dec. 19, 1997, entitled "CONICAL HYDRODYNAMIC BEARING WITH TWO INDEPENDENT CIRCULATION PATHS", by Jennings, et al., incorporated herein by reference. The basic approach of this design is to create a bearing with two independent flow paths, designated in this case path 101 and path 102, which travel over two independent conical bearings, generally indicated at 104, and 106 and are separated by a portion 108 of the shaft, which is also incorporated in the flow paths. A sleeve 110 surrounds the upper cone 104 and lower cone 106 and has concave surfaces 115, 117 facing the convex surfaces of the cones 104, 106 to define gaps through which lubricating fluid flows. A pair of sealing plates 112, 114 are provided, one at each end adjacent a radial surface of each conical bearing and defining a gap comprising a radial element of the flow path. The path is completed through upper and lower exit ports 120, 122 to reservoir 124 and common entry port 126 which is the return for both paths 101, 102 to the reservoirs. Thus, two separate flow paths 101, 102 are defined, one around the top cone and one around the bottom cone. As the load or RPM changes, the flow rates through these paths will change. The flow rates do not have to be the same in each flow path for the bearing seals to function properly, since the paths are now separated. However, the design is fairly complex to fabricate.

FIG. 4 shows an embodiment of the present invention in which the recirculating flow paths are defined around the conical bearings, and do not travel along the central portion 402 of the shaft 400; no reservoir is provided. According to the present invention, two independent circulation paths 410, 412 are defined. Each circulation path is around one of cones 414, 416, which are supported on the shaft 400 and separated from each other by a central shaft section 402. The outer convex surfaces 418, 420 support spiral or herringbone patterns of grooves as shown in FIGS. 5A–5D in order to promote and maintain the circulation of bearing fluid along the paths 410, 412. These paths essentially are defined as including these sections, including a gap between the surfaces of each cone 414, 416 and the surrounding sleeve; a gap between the interior of each cone and the shaft 400; and a gap between a base or radial surface of each cone and one of sealing plates 421, 422 supported by sleeve 408 adjacent the base of each cone.

More specifically, a first section of each path includes a gap 424, 426 between the convex surfaces 428, 430 of the cones 414, 416, and the facing, complementary concave surfaces 431, 432 of the sleeve.

One of the surfaces of each first gap section 424, 426 has spiral or herringbone grooves to promote the circulation of fluid through the entire path 410, 412. Preferably, as shown in FIGS. 5A–5D, the convex surfaces 428, 430 of the cones 414, 416 have the grooves. FIGS. 5A and 5B show potential groove patterns for convex surface 430; FIGS. 5C and 5D show groove patterns for convex surface 428. Other patterns may be as effective; the primary goal is achieving efficient fluid circulation.

A second section of each circulation path is defined between the sealing plate 421, 422, and a radially extending or base surface 446, 448 of each conical bearing. The sealing plates 421, 422 are held in place by a shoulder 450, 452 of the sleeve 408 and rotate with the sleeve. A sealing ring 454, 456 is captured in a groove of the sleeve between the sleeve and the sealing plate 442, 444 so that fluid does not escape radially from the radial section of circulation paths 410, 412. In order to prevent escape of the fluid between sealing plate 422 and shaft 400, in accordance with known technology, a capillary seal is formed between the facing surfaces of the fixed shaft 400, and the sealing plates 421, 422 so that the fluid cannot escape by moving away from the conical bearing. A slight gap, 460, 462 is left between the fixed shaft 400, and the sealing plates 421, 422. As can be seen from an inspection of the figure, the width of the gap increases slightly as the gap extends away from the radial surface of the conical bearing. A surface coating may be applied to one or both of the facing surfaces to enhance the sealing capabilities of the capillary seal. The design and utilization of such capillary seals has previously been identified and described in a number of patents in the hydrodynamic bearing technology, although not specifically in conjunction with conical seals as described herein.

Figure 6A:
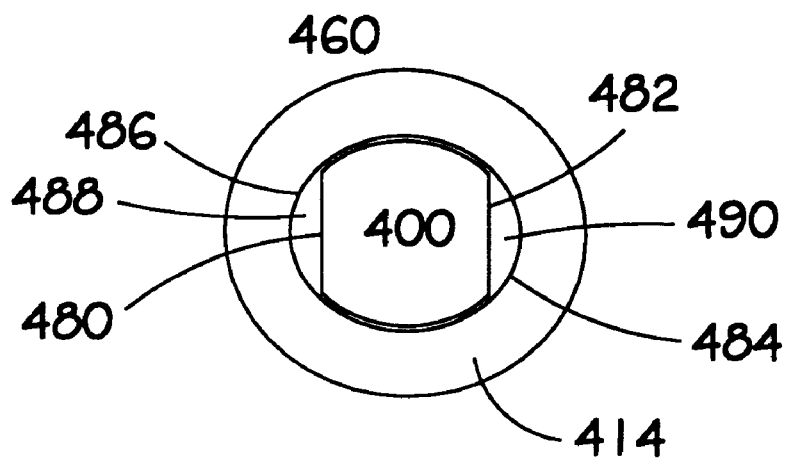
FIGS. 6A and 6B are sectional views of a conical bearing in the embodiment of FIG. 4.
Figure 6B:
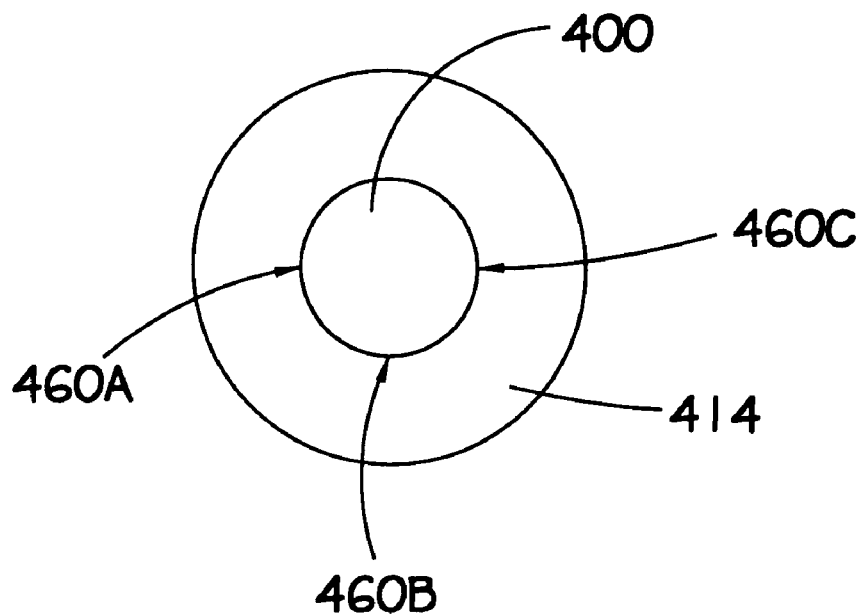

Continuing with the description of the fluid bearing flow paths 410, 412 the third segment lies between an outer surface of the shaft 400 and an inner surface of the conical sections 414, 416 which are mounted on the shaft. According to a preferred embodiment of the invention, the surface of the shaft 400 has one or more flats, or flat surfaces, on its axial face where it meets each of the cones, 414, 416. Therefore, a section AA, as marked on FIG. 4, would appear as shown in FIG. 6A, with the shaft 400 having one or more flat faces 480, 482 facing the interior axial surface 484 of the cone. The cone 414 itself is preferably designed with a substantially circular interior surface 486 so that gaps 488, 490 are defined which the lubricating fluid following the circulating path 410, 412 may easily pass through. The use of the gap between the flat surface or shaped surface on the exterior of the shaft 400 and the interior surface of the cone provides for a sufficient gap for the fluid circulation so that the recirculation of the fluid under all circumstances is reliable and is easily maintained. An alternative approach, which appears in FIG. 6B provides grooves 460 A, B, C on the internal surface of the conical sections 414, 416. The lubricating fluid will circulate easily through these grooves without the risk of forming air bubbles or pockets.

Further, it can be seen that this design as compared to the design of FIG. 3, allows for a longer capillary seal to be established at 460, 462 because there is no undercut in the conical sections 414, 416; rather, only a taper is needed on the exterior of the shaft to form one of the sidewalls of the capillary seal.

It can also be seen that this design lends itself to a relatively easy form of assembly. It can be appreciated that one of the cones could be set in place adjacent the flat or other featured surface of the shaft and bonded swaged or welded or press fitted in place. After the sleeve 408 is set in place, then the opposite cone 414 or 416 can be set in place using an air gage. Then the sealing rings 454, 456 can be inserted in their grooves, and the sealing plates 442, 444 pressed into place.

Finally, FIG. 4 also illustrates the use of the cartridge in a preferred embodiment, where the cartridge is incorporated in a spindle motor to be used in the disc drive of FIG. 1. As can be seen in this figure, the bottom extended portion 500 of the shaft 400 can be seated in a base 502 which can easily form the base of a disc drive. A magnet 504 can be supported on the outer surface of the sleeve 408; and a stator with appropriate laminations 410 can be supported from the base. In an especially efficient form, the base can be recessed so that the magnet 504 and laminations 510 are aligned, and a hub 512 is mounted to rotate one or more discs 516. The cover which appears in FIG. 1 of this description, can then be fastened to the top extended portion 522 of the shaft 400 so that the shaft is now affixed at both ends to the top and bottom of the housing. This establishes a very stable central shaft for the cartridge and spindle motor so that the rotation of the spindle motor and the discs it carries is very stable relative to the actuators which are flying over the surface of the disc.

A further advantage of this design over the current thrust plate designs is that outward pumping grooves, may be defined on the surfaces 116, 118, of the respective cones 106, 104. These outwardly pumping grooves which pump fluid toward the ends of the shaft make the design more tolerant to the presence of air in the bearing, by forcing the air away from the center of the shaft. The grooves may be either spiral or herringbone in form as shown in FIGS. 5A, 5B, 5C and 5D for the upper and lower cones, respectively.

Thus the dual cone design will provide substantially increased stiffness over designs of the type shown in FIG. 2, which use a long shaft and perpendicularly disposed thrust plates. The increased structural strength and stiffness of the bearing of the present invention is due to several factors;

one, the stiffness can be enhanced by this design by fastening it at both the top and bottom of the shaft;

two, the stress is now distributed over the length of the bearing, rather than being concentrated on one end;

three, the narrow portion of the shaft 108 (which is also the journal center) is shorter than in prior art designs as shown in FIG. 2;

four, the conical regions, which occupy in the preferred embodiment more than half the length of the overall design widen to a point of being approximately twice as thick as the shaft, thus allowing the system to be assembled without distortion of any element even though the margins between the shaft and sleeve can be made very close.

Although the present invention has been described with reference to preferred embodiments, workers skilled in the art will recognize that chances may be made in form and detail without departing from the spirit and scope of the invention. For example, FIG. 4 also illustrates that shaft end sections 500, 522 can easily be extended beyond the ends of the sleeve 408 as established by the sealing plates 421, 422. The shaft 400 could then be left free to rotate relative to the surrounding sleeve 408 which may be held stationary or itself be rotating at a different speed. Therefore, the scope of the present invention is defined by the following claims.

What is claimed is:

1. A hydrodynamic fluid bearing cartridge comprising a fixed central shaft carrying at least first and second conical elements separated by a circular shaft portion, said first and second conical elements being separated from distal ends of said shaft by outer end sections of said shaft, each of said conical elements comprising a generally conical surface and including an axial surface and a radial surface which extends from said axial surface to said conical surface, and a sleeve which rotates relative to the fixed shaft around a central axis of rotation defined by a central axis of said shaft, said sleeve supporting a counterplate to define a recess for each of said first and second conical elements, said recesses each including radial surfaces and generally conical surfaces facing said radial and conical surface of each said conical elements, to define a continuous gap around each said conical element, said gap further extending between said axial surfaces of said conical element extending parallel to an axial face of said fixed shaft, so that said continuous gap is defined around each said conical element, and lubricating fluid in said gap between said shaft and said sleeve and said conical element and said sleeve so that said sleeve is free to rotate relative to said fixed shaft and said conical element while maintaining the stiffness of said sleeve relative to said shaft.

2. A fluid bearing cartridge as claimed in claim 1 wherein there is no fluid circulation along the gap between the circular shaft portion separating the first and second conical elements.

3. A fluid bearing cartridge as claimed in claim 2 wherein outer conical surfaces of the conical elements support spiral or herringbone patterns of grooves.

4. A fluid bearing cartridge as claimed in claim 2 wherein said axial face of said shaft facing said conical element is relatively flat so that a gap for said fluid is defined between the conical element and the shaft.

5. A fluid bearing cartridge as claimed in claim 2 wherein the interior surface of each conical element facing the shaft has one or more grooves thereon to define a fluid flow passage.

6. A fluid bearing cartridge as claimed in claim 1 further including a sealing plate supported at either end of the shaft facing a radial surface of the conical element and defining a capillary seal with the shaft so that the fluid circulating around the conical element cannot escape past the ends of the shaft.

7. A magnetic disc storage system comprising a housing for one or more discs, means for supporting said one or more discs for constant speed rotation, and means for accessing data storage locations on each of said discs, said means for supporting comprising fluid-filled hydrodynamic bearing means for enabling a hub supporting said one or more discs to rotate relative to a shaft, said bearing means including conical bearing means for establishing and supporting fluid flow over all bearing surfaces of conical elements of said conical bearing means supported on either end of said shaft.

* * * * *